United States Patent [19]
Cikanek et al.

[11] Patent Number: 5,269,143
[45] Date of Patent: Dec. 14, 1993

[54] DIESEL ENGINE TURBO-EXPANDER

[75] Inventors: Harry A. Cikanek, Northville; Vemulapalli D. N. Rao, Bloomfield Hills, both of Mich.

[73] Assignee: Ford Motor Company, Dearborn, Mich.

[21] Appl. No.: 986,221

[22] Filed: Dec. 7, 1992

[51] Int. Cl.[5] .................................. F02B 29/04
[52] U.S. Cl. ............................... 60/599; 60/612; 123/563; 123/52 M
[58] Field of Search ............... 60/599, 612; 123/563, 123/592, 52 M

[56] References Cited

U.S. PATENT DOCUMENTS

| | | | |
|---|---|---|---|
| 3,947,379 | 3/1976 | Feins | 252/463 |
| 4,031,185 | 6/1977 | Akimoto et al. | 423/239 |
| 4,131,432 | 12/1978 | Sato et al. | 422/177 |
| 4,140,654 | 2/1979 | Yoshioka et al. | 252/440 |
| 4,164,546 | 8/1979 | Welty, Jr. et al. | 423/239 |
| 4,182,745 | 1/1980 | Nishida et al. | 423/239 |
| 4,186,177 | 1/1980 | Shiga et al. | 423/239 |
| 4,188,365 | 2/1980 | Yoshioka et al. | 423/239 |
| 4,192,855 | 3/1980 | Ginger | 423/239 |
| 4,199,555 | 4/1980 | Itoh et al. | 423/239 |
| 4,267,155 | 5/1981 | Kobayashi et al. | 423/235 |
| 4,270,365 | 6/1981 | Sampietro | 60/599 |
| 4,367,162 | 1/1983 | Fujitani et al. | 252/443 |
| 4,370,508 | 1/1983 | Kaeding | 585/467 |
| 4,438,082 | 3/1984 | Dettling et al. | 423/235 |
| 4,473,537 | 9/1984 | Ford, Jr. et al. | 423/239 |
| 4,477,584 | 10/1984 | Kaeding | 502/77 |
| 4,485,624 | 12/1984 | Melchior | 60/599 |
| 4,542,006 | 9/1985 | Voorhoeve | 423/365 |
| 4,585,632 | 4/1986 | Schneider et al. | 423/239 |
| 4,666,882 | 5/1987 | Okazaki et al. | 502/338 |
| 4,710,363 | 12/1987 | Fruhbuss | 423/239 |
| 4,719,094 | 1/1988 | Rieckert et al. | 423/239 |
| 4,744,962 | 5/1988 | Johnson et al. | 423/235 |
| 4,798,813 | 1/1989 | Kato et al. | 502/60 |
| 4,886,650 | 12/1989 | Perry | 423/235 |
| 4,966,873 | 10/1990 | Iida et al. | 502/84 |
| 4,973,399 | 11/1990 | Green et al. | 208/120 |
| 4,978,514 | 12/1990 | Hofmann et al. | 423/235 |
| 5,038,725 | 8/1991 | Okazaki et al. | 123/52 M |
| 5,092,285 | 3/1992 | Beaber | 123/52 MB |

FOREIGN PATENT DOCUMENTS

| | | | |
|---|---|---|---|
| 0000322 | 1/1989 | Japan | 60/599 |
| 0290089 | 4/1953 | Switzerland | 60/599 |
| 2129055 | 5/1984 | United Kingdom | 60/599 |

OTHER PUBLICATIONS

Development of Combustion Air Refrigeration System Reliable Operation at 220 psi bmep for a Large Four-Cycle Spark-Ignited Gas Engine, M. J. Helmich, ASME, 1965.

An Intake Charge Cooling System For Application to Diesel, Gasoline and Natural Gas Engines, Roy C. Meyer, et al, SAE Technical Paper No. 910420, Feb. 25–Mar. 1, 1991.

Primary Examiner—Richard A. Bertsch
Assistant Examiner—Charles G. Freay
Attorney, Agent, or Firm—Roger L. May; Joseph W. Malleck

[57] ABSTRACT

A cooling system for cooling intake air in an internal combustion engine. The system comprised of a two-stage turbocharging subsystem having two turbine driven compressors in series with two intercoolers and a closed-loop refrigeration subsystem having cooling coils within or in close proximity to the insulated intake manifold of the engine. This cooled intake air results in a lower peak combustion temperature which results in lower levels of nitrous oxides emitted by the engine exhaust.

16 Claims, 2 Drawing Sheets

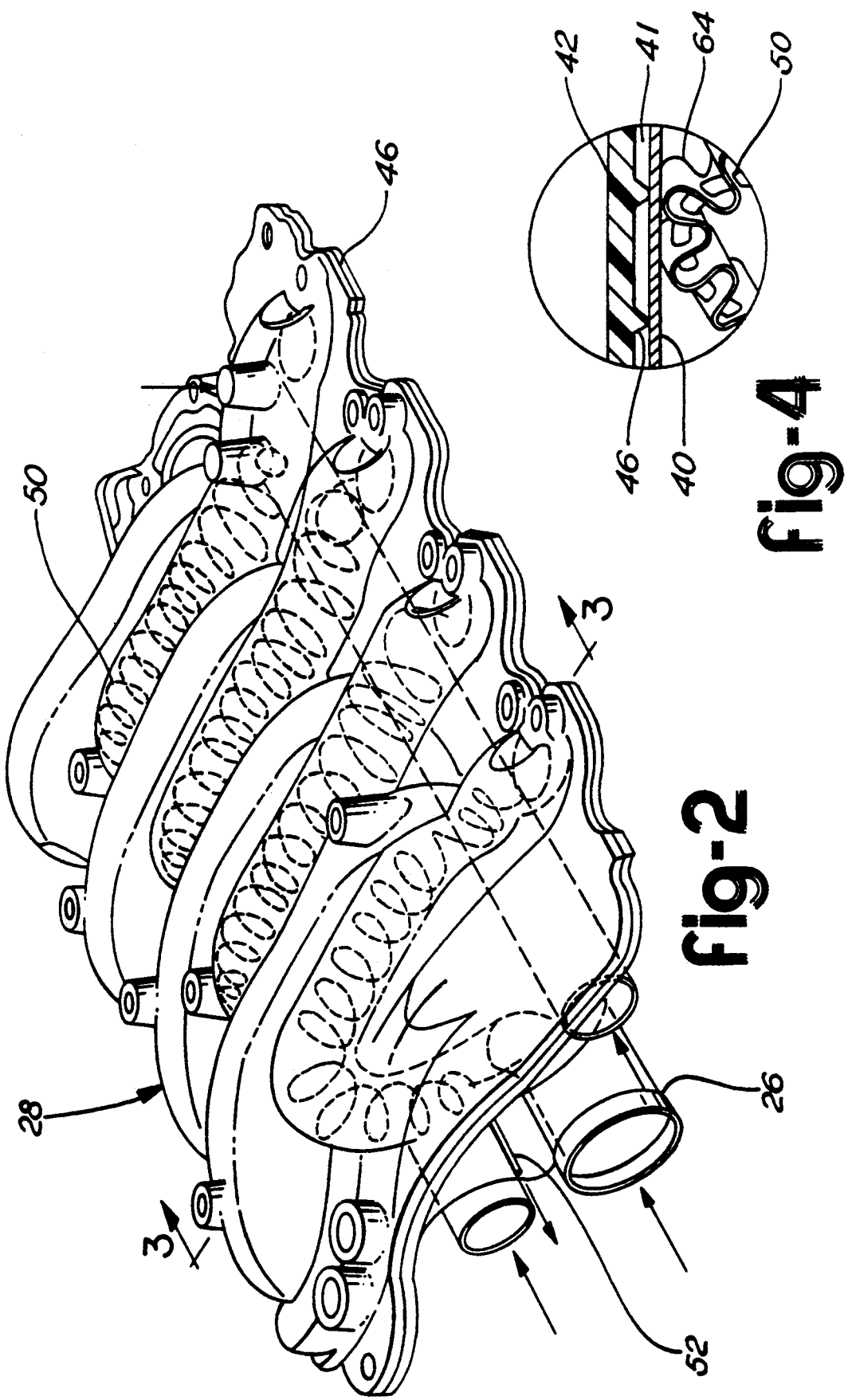

DIESEL ENGINE TURBO-EXPANDER

TECHNICAL FIELD

This invention relates to inlet charge temperature control for an internal combustion engine and, more particularly, to a combustion air refrigeration system for cooling inlet charges, resulting in reduced nitrous oxide emissions in the exhaust.

BACKGROUND OF INVENTION

During standard diesel engine combustion, oxides of nitrogen (NO, $NO_2$, etc.) are produced which result in pollution emissions from car and truck exhaust. Well known in the art is the fact that an effective way to reduce nitrous oxides ($NO_x$) in the exhaust of a diesel engine, without also increasing particulate emissions, is to reduce the peak temperature of combustion, which can be accomplished by reducing intake charged air temperatures. This type of cooling, known as intake charge cooling, is in common usage in turbocharged diesel engines.

A common form that this type of system takes is two turbine-driven compressors combined with two intercoolers in series. The outside air passes through an inlet into the first compressor and from there into a first intercooler, which reduces the air temperature. This charged air then passes through a second compressor, powered by an exhaust driven second turbine, and into a second intercooler, which further reduces temperature. Next, the charged air passes through a first turbine, which reduces the temperature further when the charged air expands and also drives the first compressor. After this, the charged air flows through duct work leading to the intake manifold.

Another form of a system known in the art that cools the intake charge is one in which a closed-loop refrigeration system is used to cool the intake air. In this system, refrigerant fluid is circulated through a condenser to remove heat from the fluid and then compressed before entering evaporator coils. The evaporator coils are located at some point along the air intake stream upstream of the intake manifold and throttle valve to cool the air intake stream by heat exchange and thereby reduce the intake air temperature.

A significant problem with both these approaches is that, after the air is cooled but before it reaches the combustion chamber, the charged air will increase in temperature due to various heat sources. The intake air duct leading up to the intake manifold and the intake manifold itself are both in the high heat environment surrounding the engine compartment and are major contributors to this warming. This warmer air entering the combustion chamber, in turn, reduces the effectiveness of this strategy for reducing $NO_x$ emissions.

SUMMARY OF INVENTION

The subject invention, therefore, contemplates an improved charged air intake cooling system in which the closed-loop refrigerant cooling system is in close proximity to, and preferably enclosed within, the intake manifold in order to cool the charged air at the closest possible point before it passes into the combustion chamber. This system, therefore, significantly reduces charged air temperature increases prior to the charged air entering the combustion chamber. The closed-loop refrigeration system includes having the evaporator coils located within the airstream in close proximity to or within the intake manifold. Specifically, the present invention contemplates an engine having an intake manifold and a cooling system for cooling the charging air prior to its induction into a combustion chamber. The cooling system is comprised of a closed-loop refrigerant fluid circulating system having an evaporator and a condenser, with the evaporator located within the intake manifold immediately upstream of the combustion chamber.

The present invention also contemplates the above-described system wherein the refrigerant fluid compressor is driven by one of the existing turbines in the intake air charging system.

The subject invention further contemplates a thermal insulating means for restricting the flow of heat into the duct leading up to the intake manifold and the intake manifold itself. This may be comprised of a double wall around the duct and intake manifold with or without an air gap between the walls, a thermal insulation wrap around them, or other suitable arrangement.

More specifically, the present invention includes an internal combustion engine having a cooling system for cooling charging air prior to its introduction into a combustion chamber through an intake manifold. The cooling system is comprised of a two-stage turbo charging system having a first and second intercooler through which the charging air may be circulated and heat extracted from the charging air. This turbocharging system includes a first compressor driven by a first turbine, and a second compressor driven by a second turbine, with the first compressor being disposed and communicating with the inlet side of the first intercooler, the second compressor being disposed at and communicating with the outlet end of the first intercooler and disposed between the first intercooler and the second intercooler whereby charging air from the first intercooler will flow through the second compressor into the second intercooler. The second intercooler is disposed on and communicates with the inlet side of the first turbine to thereby drive the first compressor, and the outlet of the first turbine communicates with a duct for then conveying the charging air from the first turbine to the intake manifold. The cooling system is further comprised of a closed-loop refrigerant fluid circulating system having an evaporator and a condenser, with the evaporator located in close proximity to the intake manifold immediately upstream of the combustion chamber whereby the charging air may be passed through the evaporator to extract heat from the charging air just prior to passing into the combustion chamber.

The present invention further contemplates an intake manifold adapted for use in an internal combustion engine which is comprised of an intake manifold wall having an inner wall member for enclosing charging air and directing the charging air into the internal combustion engine, and an outer insulating wall member surrounding the inner wall member and spaced therefrom, thereby providing an air gap between the inner wall member and the outer wall member. The outer wall member is made of an insulating plastic material. A seal is used between the inner wall member and the outer insulating wall about the periphery of the intake manifold.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 2 is a perspective view, shown in partial section, of an intake manifold for a V-8 engine and the enclosed evaporator coils for four of the eight cylinders in accordance with one embodiment of the present invention;

FIG. 4 is a view on an enlarged scale of the encircled portion A of FIG. 3 in accordance with the present invention.

BEST MODE FOR CARRYING OUT THE INVENTION

Figure 1:
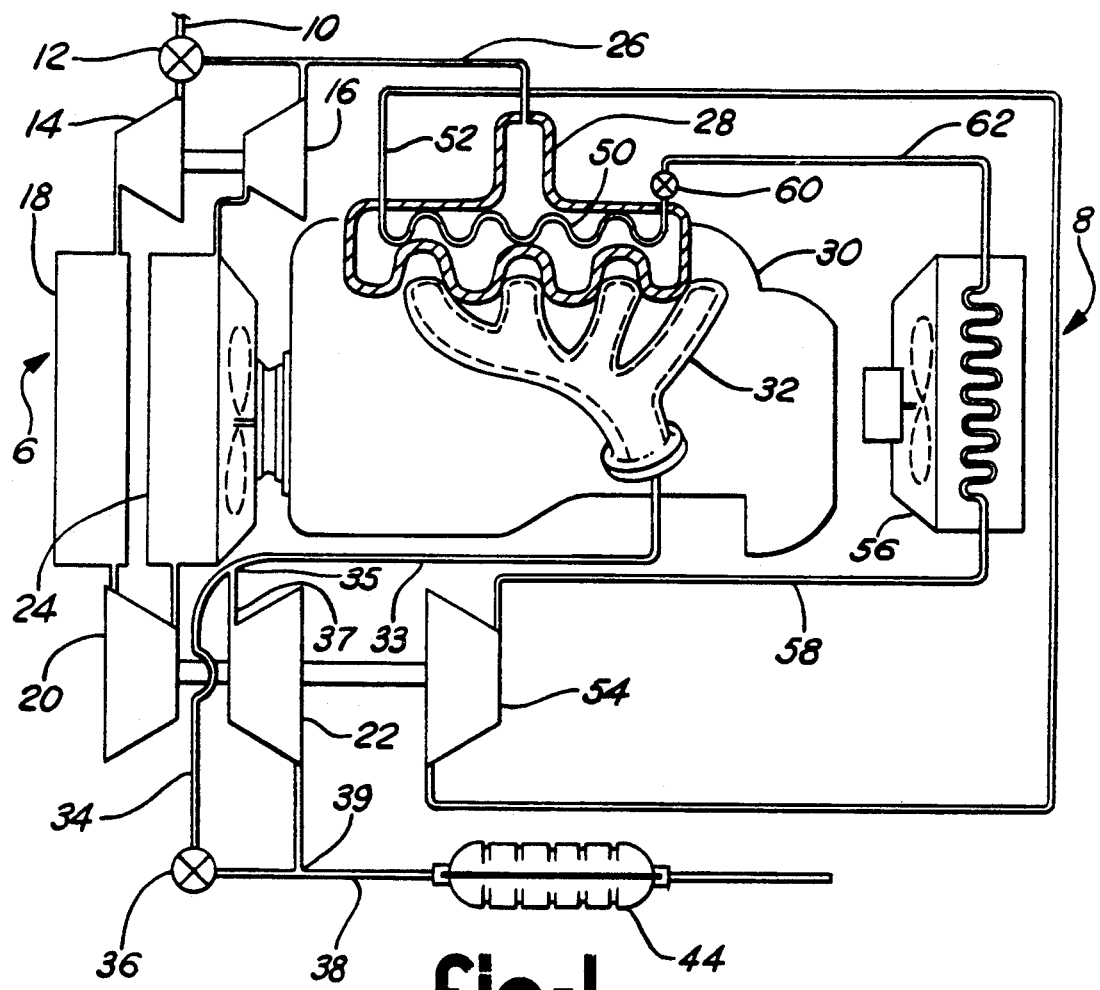
FIG. 1 is a schematic diagram showing an overall view of the system, in accordance with the present invention.

Referring to FIG. 1, the present invention consists of two major subsystems; namely, a two-stage turbocharging subsystem generally designated 6, and a closed-loop refrigerant circulating subsystem generally designated 8.

In the first subsystem 6, inlet duct 10 has an inlet at one end open to air outside the engine compartment and a cold-start bypass valve 12 connected to the other end. One outlet of the cold-start bypass valve 12 is coupled to the inlet of a first compressor 14. The first compressor 14 is rotatably coupled to and driven by a first turbine 16. The outlet of the first compressor 14 is coupled to the inlet of a first intercooler 18, and the outlet of the first intercooler 18 is, in turn, coupled to the inlet of a second compressor 20. This second compressor 20 is rotatably coupled to and driven by a second exhaust-driven turbine 22. The outlet of the second compressor 20 is coupled to the inlet of a second intercooler 24 which, in turn, is coupled to the inlet of the first turbine 16. An insulated duct 26 is attached to the outlet of the first turbine 16 at one end and attached to an intake manifold 28 at its other end. The intake manifold 28 is mounted to the intake passage on each cylinder (not shown) of the engine 30.

Figure 3:
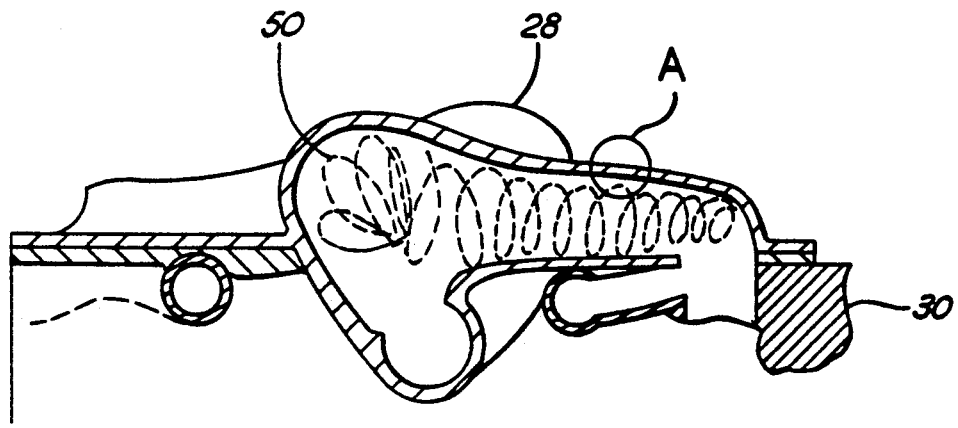
FIG. 3 is a cross-section taken along line 3—3 of FIG. 2 in accordance with the present invention.

As shown in FIGS. 2-4, the intake manifold 28 is made of a double wall construction, and has two bypass air ducts which straddle the intake duct through which the air will flow into the manifold 28. An inner wall 40 of the manifold 28 contains the charged intake air within it and directs the air into the engine through a number of ports which discharge to a respective combustion cylinder. The inner wall 40 is made preferably of a material having a low diffusivity, such as stainless steel. A material with low diffusivity will readily give up heat but does not readily pass heat through. The outer wall 42 is constructed around the outside of the inner wall 40 enclosing the inner wall 40. The outer wall 42 is preferably made of a suitable insulating material such as a phenolic plastic bonded around its outer edges to inner wall 40. In the preferred embodiment, there is an air gap 41 between the two walls so as to provide an additional insulating layer. This gap 41 is maintained by having spacers 46 protruding from and molded to the outer wall 42 at predetermined locations, or some other suitable means of maintaining the gap 41, such as having corrugations on the inner surface of the outer wall 42. Around the periphery of the intake manifold, the two walls 40, 42 are sealed together using a gasket material 46 placed between them and bolts, spaced about the periphery, clamping the two walls together.

As an alternative, the intake manifold 28 may be of a single wall construction having an insulating barrier material wrapped around or adhesively applied to the outer surface of the manifold. As a further alternative, a stainless steel inner wall 40 would have an insulating plastic injection molded to the outer surface of the inner wall, thereby forming an outer insulating wall directly on the inner wall.

Referring to FIGS. 1-3, the refrigerant circulating system 8 has cooling coils 50 which make up the evaporator and are located within the intake manifold 28. A first refrigerant tube 52 connected to one end of the coils 50 exits through the wall of the intake manifold 28 and is connected to the inlet of a refrigerant compressor 54. The outlet of the refrigerant compressor 54 is connected to the inlet of a condenser 56 via a second refrigerant tube 58. Next, the outlet end of the condenser 56 is connected to an expansion valve 60 via a third refrigerant tube 62. This expansion valve 60 is connected to the opposite end of the cooling coils 50, thereby completing the closed loop in which refrigerant will flow. The refrigerant fluid is a standard refrigerant such as freon, chlorohydrocarbon, or ammonia.

Within the inner manifold wall 40 of the intake manifold 28, the cooling coils 50 are spiral shaped with the spirals being a diameter somewhat less than the diameter of the inner manifold wall 40. Cooling fins 64 are wrapped around or attached to the cooling coils 50 in a wave pattern, as shown in FIG. 4. These cooling fins 64, which are made of a good heat transfer material such as a thin sheet of aluminum, effectively increase the surface area of the cooling coils 50 that contacts the passing intake charge, thus assuring adequate surface area for heat transfer. While the cooling fins 64 further restrict charged air flow through the intake manifold 28 by reducing the flow area, the reduced temperature of the charged air will reduce the air viscosity to counteract the restricted flow area, thus maintaining sufficient volume of air flow through the intake manifold 28 into the engine.

As shown in FIG. 1, the outlet passage of each cylinder in the engine 30 is affixed to the inlet side of an exhaust manifold 32. The exhaust manifold 32 is of a double wall construction to retain the heat energy of exhaust, thereby (i) insulating the heat of the exhaust from the cool charged air entering the engine 30, and (ii) increasing the thermal efficiency in driving the second turbine 22. The exhaust from the manifold 32, is discharged through an exhaust duct 33 which is divided at a juncture 35 to direct exhaust to the turbine 22 through a duct 37 or through a bypass duct 34. The opposite end of the bypass duct 34 is connected to the inlet of a bypass valve 36. The outlet of the turbine 22 and the bypass valve 3 join together at a second juncture 39 to form one exhaust pipe 38 before exiting the engine compartment and then passing to a ceramic filter particulate trap 44.

In operation, intake air from outside the engine compartment is drawn in through the inlet duct 10. The inlet air then passes through the cold-start bypass valve 12 where the valve 12 diverts the inlet air around the turbo-expander subsystem and directly into the intake manifold 28 when initially starting a cold engine 10. This warm air charge allows for quick starts and low rpm operating conditions. Beyond start-up, as the engine is warmed to a predetermined temperature, a suitable control (not shown) regulating bypass valve 12 causes the valve to open. This allows the inlet air to flow through the cold-start bypass valve 12 and into the first compressor 14, driven by the first turbine 16, where the air is compressed. The charged air then passes into the first intercooler 18 where heat is drawn away from the charged air. Next, the charged air passes into the second compressor 20, driven by the second turbine 22, and is further compressed before entering the second intercooler where more heat is drawn away from the charged air. The charged air then passes through and drives the first turbine 16. As the charged air passes through the first turbine 16, it expands, thus decreasing the charged air temperature further. The charged air then passes through insulated duct 26 into the double wall intake manifold 28. Once the charged air is in the intake manifold 28, it flows across the cooling coils 50, further cooling the charged air just before it enters the combustion chamber of the engine 30.

The cooling coils 50 are kept cold by the closed-loop refrigerant circulating subsystem 8. The refrigerant flows through the refrigerant compressor 54, which is driven by the second turbine 22, and compressed before flowing into the condenser 56. Alternatively, the refrigerant compressor 54 could be operatively connected to and driven by the first turbine 16. There heat is removed from the refrigerant, and it then passes through the expansion valve 60. As the refrigerant expands in the expansion valve 60, the temperature of the refrigerant drops again before entering the cooling coils 50 of the evaporator.

After combustion, the exhaust exits the engine 30 into the exhaust manifold 32 and enters the second turbine 22 if the bypass valve 36 is closed or partially closed. If the bypass valve 36 is open, as during cold start-up, the second turbine 22 is bypassed via bypass duct 34. The partial opening or closing of the valve 36 allows for regulation of the amount of exhaust flowing through and driving the second turbine 22. Thereafter, the exhaust flows through the particulate trap 44.

Although particular embodiments of the present invention have been illustrated in the accompanying drawings and described in the forgoing detailed description, it is to be understood that the present invention is not to be limited to just the embodiments disclosed. As an example, it may also be used to advantage with heavy-duty gasoline engines or natural gas engines. Also, the refrigerant circulating subsystem with cooling coils within the intake manifold may be used without combining it with the two-stage turbocharger subsystem. Further, the present invention may be used in engines with various numbers of cylinders in either an in-line or a V-type configuration. Accordingly, numerous rearrangements, modifications and substitutions are possible without departing from the scope of the claims hereafter.

We claim:

1. In combination with an internal combustion engine having an intake manifold, a cooling system for cooling the charging air prior to its induction into a combustion chamber through said intake manifold, said cooling system comprising:

(a) a two-stage turbocharging system having a first and second intercooler through which the charging air may be circulated and heat extracted from the charging air;

said turbocharging system including a first compressor driven by a first turbine, and a second compressor driven by a second turbine, said first compressor being disposed and communicating with the inlet side of said first intercooler, said second compressor being disposed at and communicating with the outlet end of said first intercooler and disposed between said first intercooler and said second intercooler whereby charging air from said first intercooler will flow through said second compressor into said second intercooler;

said second intercooler disposed on and communicating with the inlet side of said first turbine to thereby drive said first compressor, and means for then conveying said charging air from said first turbine through the intake manifold; and (b) a closed-loop refrigerant fluid circulating system having an evaporator and a condenser;

said evaporator being located within the intake manifold immediately upstream of the combustion chamber whereby the charging air may be passed through said evaporator to extract heat from the charging air just prior to passing into the combustion chamber.

2. The invention of claim 1 wherein said closed-loop refrigerant fluid circulating system further includes a compressor for compressing the refrigerant fluid being circulated through said refrigerant circulating system, said refrigerant fluid circulating system being driven by one of said first and second turbines, and an expansion valve for expanding the refrigerant fluid just prior to entrance into said evaporator.

3. The invention of claim 2 wherein said cooling system compressor is driven by said second turbine.

4. The invention of claim 3 wherein said internal combustion engine further includes an exhaust manifold for exhausting combustion products from the engine; and means for conveying said exhaust gases to said second turbine for driving said second turbine.

5. The invention of claim 4 wherein said exhaust manifold is comprised of an inner wall for enclosing said exhaust combustion products, and an outer wall surrounding said inner wall and spaced therefrom, thereby providing an air gap between said inner wall and said outer wall.

6. The invention of claim 4 further including bypass means for (i) bypassing the charging air from said two-stage turbocharging system directly to said intake manifold and through said evaporator of said closed-loop refrigerant fluid circulating system, and (ii) bypassing the exhaust gases from said second turbine to thereby vent the exhaust gases directly to the atmosphere, whereby during cold start operation the turbocharging system may be entirely bypassed.

7. The invention of claim 6 wherein said intake manifold includes thermal insulating means for restricting the flow of heat from the surrounding internal combustion engine into the charging air.

8. The invention of claim 7 wherein said thermal insulating means is composed of an outer wall member surrounding and spaced from said intake manifold, thereby leaving an air gap between internal walls of said intake manifold and said thermal insulating means.

9. In combination, an internal combustion engine having an intake manifold, and a cooling system for cooling the charging air prior to its induction into a combustion chamber, said cooling system comprising:

a closed-top refrigerant fluid circulating system having an evaporator, and a condenser;

said evaporator being located within said intake manifold immediately upstream of the combustion chamber whereby the charging air may be passed through said evaporator to extract further heat from the charging air just prior to passing into the combustion chamber.

10. The invention of claim 9 wherein said closed-loop refrigerant fluid circulating system further includes a compressor for compressing said refrigerant fluid being circulated through said refrigerant circulating system, said refrigerant circulating system being driven by a turbine, rotatably mounted to said compressor, and an expansion valve for expanding said refrigerant fluid just prior to entrance into said evaporator.

11. An intake manifold adapted for use in an internal combustion engine, comprising:
   an intake manifold wall having an inner wall member for enclosing charging air and directing said charging air into said internal combustion engine, and an outer insulating wall member surrounding said inner wall member and spaced therefrom, thereby providing an air gap between said inner wall member and said outer wall member, said outer insulating wall member being made of an insulating plastic material; and
   means for sealing between said inner wall member and said outer insulating wall about the periphery of said intake manifold.

12. The invention of claim 11 wherein said intake manifold includes an evaporator coil within said intake manifold wall whereby charging air may be passed through said evaporator coil prior to entering said engine.

13. The invention of claim 12 wherein said evaporator coil includes a cooling fin made of a thin sheet bent into a wave shape and wrapped around said evaporator coil.

14. The invention of claim 11 wherein one of said outer and inner wall members of said intake manifold includes an inner surface facing the other one of said inner and outer wall members and having a plurality of corrugations protruding therefrom to maintain said air gap between said wall members.

15. In combination with an external combustion engine having an intake manifold and an exhaust manifold for exhausting combustion products from the engine, a cooling system for cooling the charging air prior to its induction into a combustion chamber through said intake manifold, said cooling system comprising:
   a two-stage turbocharging system having a first and second intercooler through which the charging air may be circulated and heat extracted from the charging air;
   said turbocharging system including a first compressor driven by a first turbine, and a second compressor driven by a second turbine, said first compressor being disposed and communicating with the inlet side of said first intercooler, said second compressor being disposed at and communicating with the outlet end of said first intercooler and disposed between said first intercooler and said second intercooler whereby charging air from said first intercooler will flow through said second compressor into said second intercooler;
   said second intercooler disposed on and communicating with the inlet side of said first turbine to thereby drive said first compressor, and means for then conveying said charging air from said first turbine through the intake manifold;
   a closed-loop refrigerant fluid circulating system having an evaporator and a condenser;
   said evaporator being located in close proximity to the intake manifold immediately upstream of the combustion chamber whereby the charging air may be passed through said evaporator to extract heat from the charging air just prior to passing into the combustion chamber;
   said closed-loop refrigerant fluid circulating system further including a compressor for compressing the refrigerant fluid being circulated through said refrigerant fluid circulating system, said refrigerant fluid circulating system being driven by said second turbine, and an expansion valve for expanding the refrigerant fluid just prior to entrance into said evaporator;
   means for conveying said combustion products to said second turbine for driving said second turbine;
   bypass means for (i) bypassing the charging air from said two-stage turbocharging system directly to said intake manifold and through said evaporator of said closed-loop refrigerant fluid circulating system, and (ii) bypassing the exhaust gases from said second turbine to thereby vent the exhaust gases directly to the atmosphere, whereby during cold start operation the turbocharging system may be entirely bypassed; and
   said intake manifold including thermal insulating means for restricting the flow of heat from the surrounding internal combustion engine into the charging air, the thermal insulating means being comprised of an outer wall member surrounding the spaced from said intake manifold, thereby leaving an air gap between internal walls of said intake manifold and said thermal insulating means.

16. The invention of claim 15 wherein said exhaust manifold comprises an inner wall for enclosing said exhaust combustion products, and an outer wall surrounding said inner wall and spaced therefrom, thereby providing an air gap between said inner wall and said outer wall.

* * * * *